Dec. 25, 1928.  
J. L. SHROYER  
TOASTER  
Filed Aug. 16, 1926  
2 Sheets-Sheet 1  
1,696,613

Inventor:  
Jacob L. Shroyer,  
by *Alexander S. [signature]*  
His Attorney.

Dec. 25, 1928.   1,696,613
J. L. SHROYER
TOASTER
Filed Aug. 16, 1926   2 Sheets-Sheet 2

Inventor:
Jacob L. Shroyer,
by *His Attorney.*

Patented Dec. 25, 1928.

1,696,613

UNITED STATES PATENT OFFICE.

JACOB L. SHROYER, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

TOASTER.

Application filed August 16, 1926. Serial No. 129,336.

My invention relates to toasters, more particularly to automatic toasters of the conveyor type, and has for its object the provision of the simple, reliable and efficient device of this character.

In carrying out my invention in one form, I provide a horizontal conveyor, the bread to be toasted being placed on the conveyor at the front of the toaster and carried toward the rear in close proximity to suitable heating means whereby the bread is toasted. At the rear of the toaster the bread is fed by the conveyor to means for returning it to the front of the toaster, this means being shown as an inclined slide. Among other things, I also provide means for regulating a draft of cooling air around the heating means whereby the generation of heat may be regulated for different toasting operations and for light or heavy loads, and also a special crumb tray arrangement below the heating means.

Figure 1:
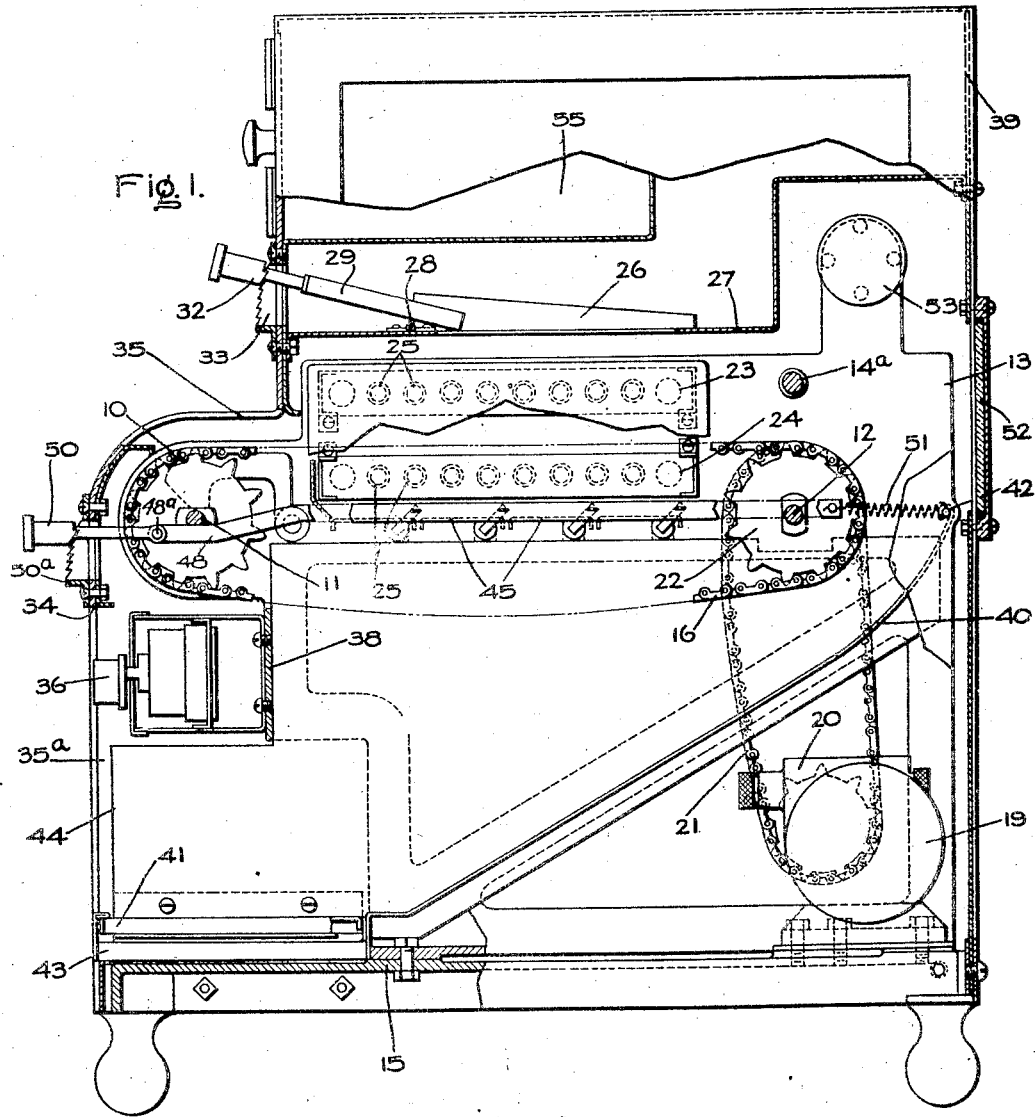
Figure 3:
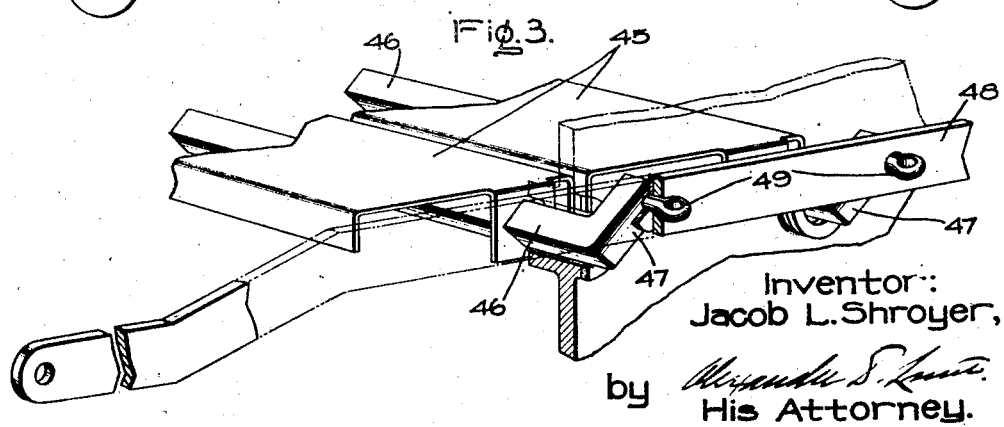
Figure 2:
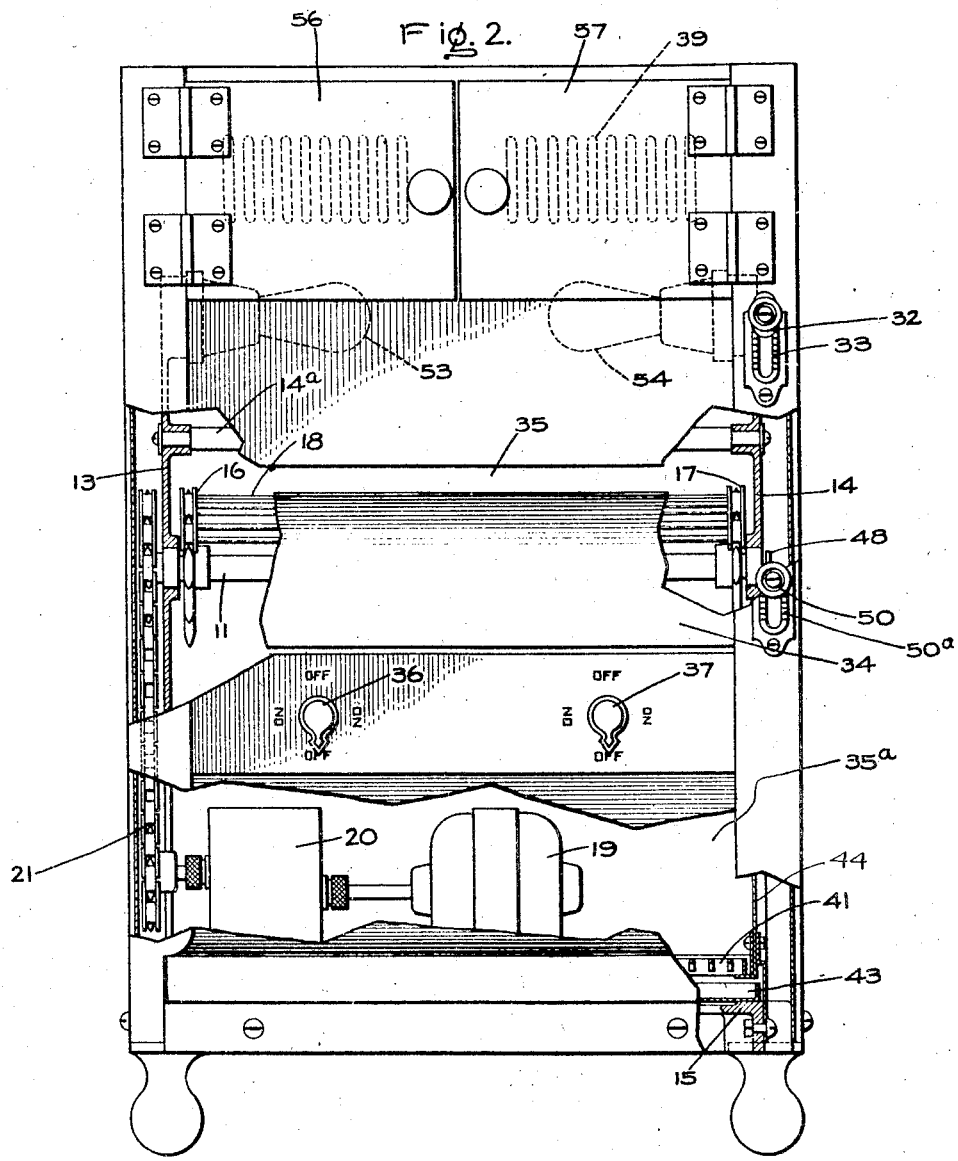

For a more complete understanding of my invention reference should be had to the accompanying drawing, in which Fig. 1 is a side view mainly in section of a toaster embodying my invention; Fig. 2 is a front view partially in section of the device shown in Fig. 1; while Fig. 3 is an enlarged fragmentary view showing details of the crumb trays.

Referring to the drawing, my invention in one form comprises a horizontally arranged endless conveyor 10 extending from the front to the back of the toaster. This conveyor is mounted on shafts 11 and 12 which are rotatably mounted on side supporting plates 13 and 14. The side supporting plates 13 and 14 are secured to a base-plate 15 in upright positions and in spaced parallel relation to each other. These side plates 13 and 14 and the base-plate 15 are preferably cast from a suitable metal, such as iron, the three parts forming the main supporting structure for the various parts of the toaster. At the top the plates 13 and 14 are secured together by means of a tie rod 14ª. As shown, the conveyor 10 is of a well known construction, it consisting of two parallel chains 16 and 17, each of which passes over sprocket wheels secured to the shafts 11 and 12 at adjacent ends thereof. These chains are joined by transverse parallel rods 18 on which the slices of bread to be toasted are placed. The conveyor is driven by means of an electric motor 19 mounted on the base-plate 15, the mechanical driving connection from the motor being through speed reducing gears (not shown) mounted in a casing 20 and a chain 21 which connects with a sprocket wheel 22 secured on the outer end of the shaft 12, this shaft being extended through the side-plate 13. The conveyor is driven in such direction that slices of bread placed upon it at the end adjacent the shaft 11, that is, the front end, are carried on the conveyor toward the opposite or back-end of the toaster.

In its journey on the conveyor the bread passes between spaced electric heating units 23 and 24 whereby the bread is toasted on both sides simultaneously. These heating units are mounted on suitable brackets carried by the side plates 13 and 14. They extend substantially across the space between the side supports 13 and 14, and in the direction from the front to the rear of the toaster they extend over the greater part of the distance between the shafts 11 and 12. It will be understood that the arrangement of the units with respect to the conveyor is such that with the conveyor driven at a predetermined rate of speed, the slices of bread will be thoroughly toasted on both sides in being passed between the heating units.

The heating units are of any suitable openwork type such that cooling air may be circulated through the units around the various heating elements to regulate the rate of heating generation. They preferably comprise electrically insulating rods 25 extending transversely across the conveyor on which are wound electric resistance heating elements. One form of this construction is shown, for example, in Patent No. 1,203,909 to Ruckle dated November 7, 1916.

The regulation of the current of cooling air around the various heating elements is controlled by means of a damper 26 directly above the heating units. This damper controls an opening or openings in a horizontal plate 27, and it is secured to the plate 27 by means of hinged joint 28 adjacent the front of the toaster so that the damper may be raised and lowered by means of arm 29 projecting from the front of the toaster and rigidly secured to the damper at one side.

A spring pressed latch 32 on the rod 29, forming a knob cooperates with a ratchet 33 to hold the damper in any adjusted position.

Placed over and enclosing the side supports 13 and 14 and the mechanism supported thereby is a casing or cover 34 having top, side, front and back walls to which the plate 27 is secured. This casing is secured to the base 15 by means of suitable screws so that it may be easily removed to give access to the interior mechanism of the toaster. At the front of the toaster the casing 34 is provided with a feeding opening 35 just above the front end of the conveyor 10 through which slices of bread may be placed on the conveyor. Just below the conveyor at the front of the toaster the casing is provided with a large opening 35$^a$. In the upper side of this opening are mounted the switches for connecting and disconnecting the heating unit 23 and 24 with respect to a suitable electrical supply source. As shown, two switches are provided, one for each heating unit, the switches being operated by means of buttons 36 and 37. The switches are mounted on a bar 38 extending across the front of the toaster and secured at its ends to the side plates 13 and 14. The driving motor 19 is connected in parallel with one of the heating units and controlled by the switch for that heating unit. This system of connections makes it impossible to turn on both heating units without having the conveyor in motion, whereby the conveyor is protected from overheating.

Through the remaining portion of the aperture 35$^a$ between the bar 38 and the base 15, cooling air has access to the space below the heating units. When the damper 26 is closed, as shown in the drawing, the circulation of cooling air is shut off, the casing then being closed above the heating units by the plate 27. When the damper 26 is opened, the hot air around the heating units rises upward through the opening in plate 27 and out at the rear of the toaster through vertical slots 39 in the casing. This draws in cold air through the opening 35$^a$, and by adjusting the damper the flow of air can be regulated to cool the heating units to the desired extent. One of the functions of the casing 34 is thus to provide in effect a flue around the heating units through which a draft is created by the hot air rising from the heating units. For full capacity operation, that is, when the maximum number of slices are placed on the conveyor, the damper 26 will be closed or nearly so, but when a smaller number of slices are being toasted the damper will be opened to a greater or less extent, depending on the number of slices, so as to allow sufficient circulation of cooling air to carry away the excess of heat. In this manner burning of the bread may be prevented and the same quality of toast obtained in small quantities or with intermittent operation as can be obtained when operating at full load capacity. Furthermore, by thus regulating the source of heat, the toaster may be adjusted for different kinds of bread, various thicknesses of slices, small differences in supply circuit voltage, etc. In fact the damper 26 provides a means for making very fine adjustments to suit the conditions of operation. If desired, the circuit connections for the heating units may be so arranged that by means of suitable control switches different rates of heat generation may be obtained. Rough adjustments may be made in this manner.

The toast falls from the conveyor at the rear of the toaster onto an inclined slide or chute 40 which extends back toward the front of the toaster and terminates just behind a grate or rack 41. The toast slides down the chute and comes to rest on the grate at the front of the toaster where it may be removed through the opening 35$^a$, which serves as a discharge opening for the toast as well as an inlet opening for the cooling air. As shown, the upper end of the chute is supported by means of a pin or rod 42 extending between the supports 13 and 14. A crumb receptacle 43 is provided below the receiving grate 41. This receptacle may be removed from the front of the toaster for cleaning. On each side of the chute 40 is a vertical guide-plate or baffle 44 which extends upward to a point just below the lower heating unit and also toward the front below the supporting bar 38 at the side of the receiving grate 41.

A plurality of narrow crumb trays 45 are provided below the heating units. These crumb trays extend in parallel relation across the toaster and are spaced apart at such distances as to provide for circulation of cooling air between them and upward through the heating units. As shown, in Fig. 3 the trays 45 are made of sheet metal and have their adjacent sides turned downward. A tab at each end is also turned downward and provided with a square aperture through which extends a square supporting bar 46 which extends loosely through suitable round bearings in the side supports 13 and 14. Each of the bars 46 is provided on one end with a crank arm 47 by means of which the bar may be rotated to dump the crumbs. The bars are arranged with the crank arms on the same side of the toaster, and the arms are pivotally connected to a horizontal rocking bar 48, and secured to the rocking bar, as shown, by means of cotter pins 49 passing through apertures in the bar and secured to the crank arms. The rocking bar extends to the front of the toaster and out through a suitable aperture in the casing, and terminates in a knob and latch 50. It is pulled toward the rear of the toaster by means of a spring 51 having one end connected to the bar and the other end connected to the rod 42. The spring normally pulls the bar toward the rear until the knob 50 rests against the ratchet 50ª. When it is desired to dump the crumbs, the knob 50 is pulled out whereby the trays are tipped forward to inclined positions and the crumbs dumped on the chute 40 which carries them to the crumb tray 43.

Provision is also made for tilting the trays 45 to regulate the circulation of cooling air around the heating units 25. The bar 48 is provided with a pivot joint 48ª near its outer end whereby the shorter outer section may be swung upward and downward about the pivot by grasping the knob 50. With the knob in the position shown the trays 45 are substantially horizontal, and by moving the knob 50 downward the trays are gradually tilted forward whereby the widths of the openings between the trays are increased. This results in a greater circulation of air around the heating units. The trays are held in any adjusted position by means of the ratchet 50ª with which cooperates a pawl carried by the knob 50. This gives a control of the heating units in addition to that provided by damper 26.

At the rear of the casing is a glass window 52 through which the bread moving between the heating units may be observed. Observation of the toasting operation through the window 52 is further facilitated by means of electric lamps 53 and 54 mounted on the supporting plates 13 and 14 respectively and connected to the same supply circuit as the heating units. The lamps are preferably controlled by one or the other of the switches for the heating units. As shown, the plate 27 is provided with a vertical portion at the rear to provide space for the lamps. This arrangement for viewing the toasting operation provides an attractive display and it is contemplated that the toaster may be placed where the toasting operation may be observed through the window 52 by the passers-by, for example, in the show window of a restaurant.

A compartment 55 is provided in the top of the casing 34 for the toast. This compartment is accessible from the front of the toaster through doors 56 and 57. It is heated by the hot air rising from the heating units.

The arrangement is such that all electrical and other parts including the heating units, motor, lights, wiring and switches can be assembled in the open framework formed by the side plates 13 and 14 and the base plate 15. The outer shell or casing 34 is then dropped down over this assembly enclosing the whole. The knobs 32 and 50 are, of course, attached after the casing has been placed in position. This construction has the important advantage of making all moving and electrical parts readily accessible for inspection and repair.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:—

1. A toaster comprising a conveyor, means for driving said conveyor, heating means for toasting a slice of bread as it is moved on said conveyor from one end to the other, and means at the discharge end of said conveyor for receiving the toast and for returning the toast to the starting end of said conveyor.

2. A toaster comprising a horizontal conveyor extending from the front to the rear of said toaster, means for driving said conveyor, heating means for toasting a slice of bread as it travels on said conveyor from the front to the rear of said toaster, and a chute at the rearward end of said conveyor for receiving the bread and returning it to the front of said toaster.

3. An electric toaster comprising a horizontal endless conveyor, electric heating units arranged above and below the upper length of said conveyor so as to toast both sides of a slice of bread as it travels between them on said conveyor, and a chute arranged to return the toast to the starting end of said conveyor.

4. An electric toaster comprising a horizontal endless conveyor extending from the front to the rear of said toaster, a casing for said conveyor provided with feeding and discharge openings at the front for the toast, spaced electric heating units arranged above and below the upper length of said conveyor, said heating units being arranged to toast both sides of a slice of bread as it travels between them on said conveyor, and a chute arranged to receive the toast from said conveyor and carry it to said discharge opening.

5. A toaster comprising a horizontal conveyor, heating units spaced at intervals along said conveyor, a plurality of crumb trays pivotally mounted underneath said heating units, said trays being spaced apart to provide for the flow of ventilating air between them, and means for moving said trays on their pivots to dump the crumbs.

6. A toaster comprising a horizontal conveyor, heating means adjacent said conveyor arranged to toast a slice of bread moving thereon, a plurality of transverse crumb trays pivotally mounted underneath said heating means, crank arms on said crumb trays, and a bar extending across the ends of said trays to which said crank arms are pivotally secured.

7. A toaster comprising a horizontal conveyor, heating units spaced at intervals along said conveyor, a plurality of crumb trays pivotally mounted underneath said heating units, means for moving said trays on their pivots to dump the crumbs, said trays being spaced apart to provide for the circulation of cooling air between them and upward around said heating units, and means for adjusting said trays on their pivots to vary the circulation of cooling air around said heating units.

8. A toaster comprising a horizontal conveyor, means for driving said conveyor, heating means for toasting a slice of bread as it is moved on said conveyor from the front to the back of the toaster, means for receiving the toast from the conveyor at the back of the toaster and for returning the toast to the front of said toaster, and a casing fitting over said conveyor provided with feeding and discharge openings at the front of said toaster.

9. A toaster comprising base and side plates forming a support, a conveyor mounted on said support, driving means for said conveyor mounted on said support, heating means spaced at intervals along said conveyor so as to toast a slice of bread traveling on said conveyor from the front to the back of said toaster, means for returning the toast to the front of said toaster, and a removable casing fitting over said support provided with feeding and discharge openings at the front of said toaster.

10. A toaster comprising a horizontal conveyor, heating means spaced at intervals along said conveyor arranged to toast a slice of bread traveling on said conveyor from the front to the back of said toaster, crumb trays under said heating means, means for tilting said trays to dump the crumbs, a chute below said crumb trays for receiving the crumbs and the toast from the back end of said conveyor and conveying them to the front of said toaster, a rack at the foot of said chute to receive the toast, a receptacle for the crumbs below said rack, and a casing fitting over said conveyor provided with a feeding opening for the toast adjacent the front end of said conveyor and with a lower opening at the front of the toaster through which the toast may be withdrawn.

11. A toaster comprising a conveyor, means for driving said conveyor, heating means adjacent said conveyor arranged to toast a slice of bread as it travels on said conveyor from the front to the rear of said toaster, means for returning the toast to the front of said toaster, a casing fitting over said conveyor having feeding and discharge openings for the toast at the front of said toaster, and a window in the back of said casing through which the toasting operation may be observed.

In witness whereof, I have hereunto set my hand this 11th day of August, 1926.

JACOB L. SHROYER.